United States Patent [19]

Nobutsugu

[11] Patent Number: 4,658,919

[45] Date of Patent: Apr. 21, 1987

[54] CONTROL SYSTEM FOR COMBINATORIAL WEIGHING OR COUNTING APPARATUS

[75] Inventor: Hideo Nobutsugu, Kyoto, Japan

[73] Assignee: Kabushiki Kaisha Ishida Koki Seisakusho, Kyoto, Japan

[21] Appl. No.: 668,894

[22] Filed: Nov. 7, 1984

[30] Foreign Application Priority Data

Nov. 8, 1983 [JP] Japan ................................ 58-209623

[51] Int. Cl.$^4$ ...................... G01G 19/00; G01G 19/22
[52] U.S. Cl. ......................................... 177/1; 177/25; 364/567
[58] Field of Search ...................... 177/1, 25, DIG. 12

[56] References Cited

U.S. PATENT DOCUMENTS

| | | | |
|---|---|---|---|
| 4,165,633 | 8/1979 | Raisanen | 73/76 |
| 4,251,874 | 2/1981 | Check, Jr. | 177/25 X |
| 4,410,962 | 10/1983 | Daniels et al. | 177/25 X |
| 4,418,771 | 12/1983 | Henry et al. | 177/25 X |

FOREIGN PATENT DOCUMENTS

| | | |
|---|---|---|
| 2425113 | 11/1979 | France . |
| 2098422 | 11/1982 | United Kingdom . |
| 0085446 | 8/1983 | United Kingdom . |

*Primary Examiner*—L. A. Goldberg
*Assistant Examiner*—Patrick W. Foster
*Attorney, Agent, or Firm*—Staas & Halsey

[57] ABSTRACT

A control system for a combinatorial weighing or counting apparatus includes a main central processing unit for effecting a combinatorial arithmetic operation, and a plurality of individual drive unit central processing units. The drive unit central processing units are associated respectively with driver units of the weighing machines and connected to the main central processing unit for controlling the drive units, respectively. Operation commands delivered from the main central processing unit to the individual drive unit central processing units are set by interrupt processes of the individual drive unit, central processing units at all times.

5 Claims, 11 Drawing Figures

CONTROL SYSTEM FOR COMBINATORIAL WEIGHING OR COUNTING APPARATUS

BACKGROUND OF THE INVENTION

The present invention relates to a control system for a combinatorial weighing or counting apparatus.

There have been used combinatorial weighing apparatus which operate by supplying articles to be weighed to weighing hoppers associated respectively with weighing machines, effecting a combinatorial operation on weights from the weighing machines with an arithmetic control unit, and opening the weighing hoppers of those weighing machines which give an optimum combination of added weights closest to a target weight as a result of the combinatorial operation, thus discharging the articles representing the optimum combination of added weights.

In the combinatorial weighing apparatus, the weighing hoppers which have discharged the articles, are immediately supplied with articles for a next weighing cycle from pool hoppers disposed above the weighing hoppers. The pool hoppers are supplied with distributed articles from a storage unit by means of an electromagnetic feeder. FIG. 1 of the accompanying drawings shows in block form such combinatorial weighing apparatus. Designated at 1 are a plurality of weighing machines W1 through Wn which issue weight values X1 through Xn (analog signals) to a multiplexer 2. When an arithmetic control unit 4 comprising a computer, applies a signal S to the multiplexer 2 in response to a timing signal T from a packaging machine 5, the weight signals applied to the multiplexer 2 are successively fed to an A/D converter 3. The weight signals are converted by the A/D converter 3 into digital signals which are applied to the arithmetic control unit 4. The arithmetic control unit 4 stores the digital signals in a memory 6, reads a necessary command from the memory 6, effects combinatorial additions to find combinations of total weight values, compares the weight combinations with a target weight value Xs, and determines a combination of total weights which is closest to the target weight value Xs. If the combination of total weights does not exceed an upper weight limit setting Xu, then this combination of total weights is used as an optimum combination. With the optimum combination produced, the arithmetic control unit 4 applies a control signal C to a weight machine driver 7 such as for the weighing hoppers or a discharge device, and then applies control signals to the electromagnetic feeder, the pool hoppers, and the weight hoppers.

Where the control system is composed of a central processing unit (CPU), and when the CPU runs out of control due to a noise signal, for example, the CPU is required to be reset by itself. However, no effective means has heretofore been available for resetting the CPU by itself. More specifically, a microcomputer generally starts its operation by reading a command from a ROM (read-only memory) into a CPU, as illustrated in FIG. 2 of the accompanying drawings.

When the CPU issues address signals to an address bus in the order to be executed, the ROM automatically delivers an instruction word to a data bus. Since the combinatorial weighing apparatus has an electromagnetic feeder actuated by SCRs (thyristors) which are phase-controlled, an electric noise signal tends to be applied to the CPU so that a wrong instruction word is read. For example, where there are instruction words 1 through 4 composed of 3 bytes, 2 bytes, 2 bytes, and 3 bytes, respectively, as shown in FIG. 3(a), the instruction word 2 may be read as a 3-byte instruction word, as shown in FIG. 3(b), or an addressing command such as a CALL command or a JUMP command may be read in error, whereupon the microcomputer system will not operate properly.

SUMMARY OF THE INVENTION

It is an object of the present invention to provide a control system for combinatorial weighing or counting apparatus, in which a program for controlling the control system including a microcomputer is composed of interrupt routines, so that each of a plurality of processes can be started with a proper address without any erroneous operation initiated by a noise signal after each process has been completed.

Another object of the present invention is to provide a control system for combinatorial weighing or counting apparatus, which includes a microcomputer system that can be reset by itself properly for each drive unit by resetting a correct interrupt wait address when an interrupt routine is started, to thereby restore a microcomputer, even if erroneous operation has been effected before the interrupt routine is started.

According to the present invention, there is provided a control system for a combinatorial weighing or counting apparatus for weighing articles charged in a plurality of weighing machines, for effecting a combinatorial arithmetic operation on obtained weights or numbers of the articles converted from the weights, for selecting an optimum combination of added weights or numbers which are closest to a target combination, and for discharging the articles from those weighing machines which give the selected combination. The control system comprises a main central processing unit for effecting the combinatorial arithmetic operation, and a plurality of individual drive unit central processing units associated respectively with driver units of the weighing machines and connected to the main central processing unit for controlling the drive units, respectively. The arrangement is such that operation commands delivered from the main central processing unit to the individual drive unit central processing units are set by interrupt processes of the individual drive unit central processing units at all times.

Command signals from the main central processing unit to the individual drive unit central processing units are delivered through a data bus line connected to the main central processing unit.

The command signals from the main central processing unit to the individual drive unit central processing units are generated in synchronism with zero crossing points of an AC power supply for each of the drive units.

The individual drive unit central processing units are interconnected by a data highway connected to the main central processing unit by a data bus line.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Generally, a microcomputer starts executing an interrupt program when interrupted by an electric signal from an external source. Since an interrupt process has highest priority, and a start address of the interrupt program is prescribed, the interrupt process will not be started in error by noise.

Figure 1:
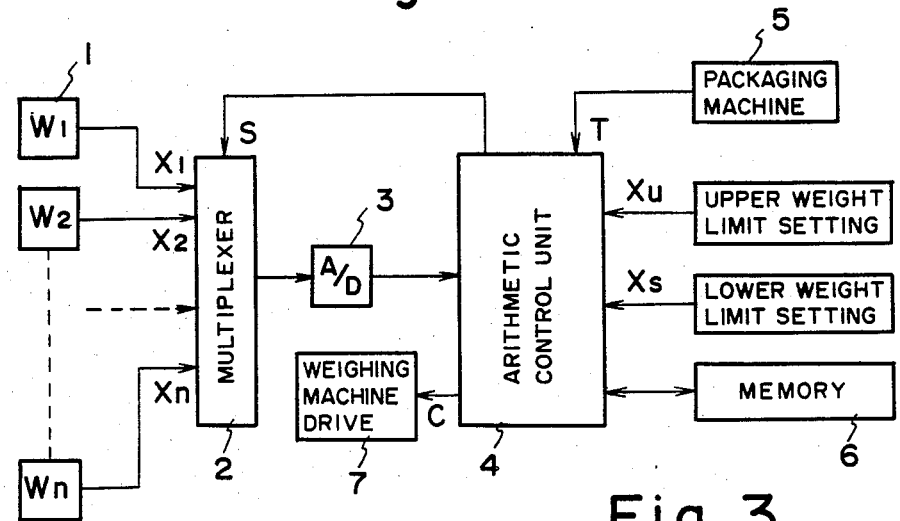
FIG. 1 is a block diagram of a combinatorial weighing apparatus.
Figure 2:
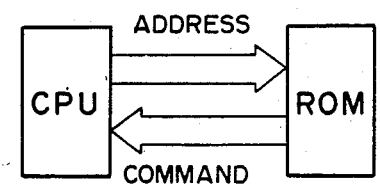
FIG. 2 is a diagram showing the basic relationship between a CPU and a ROM.
Figure 3:
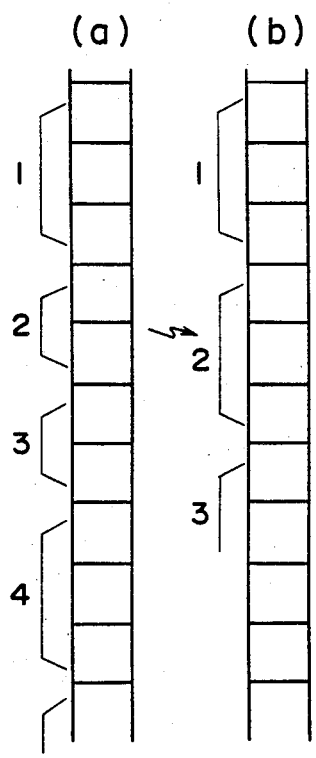
FIGS. 3(a) and 3(b) are diagrams for illustrating arrangements of instruction words.
Figure 4:
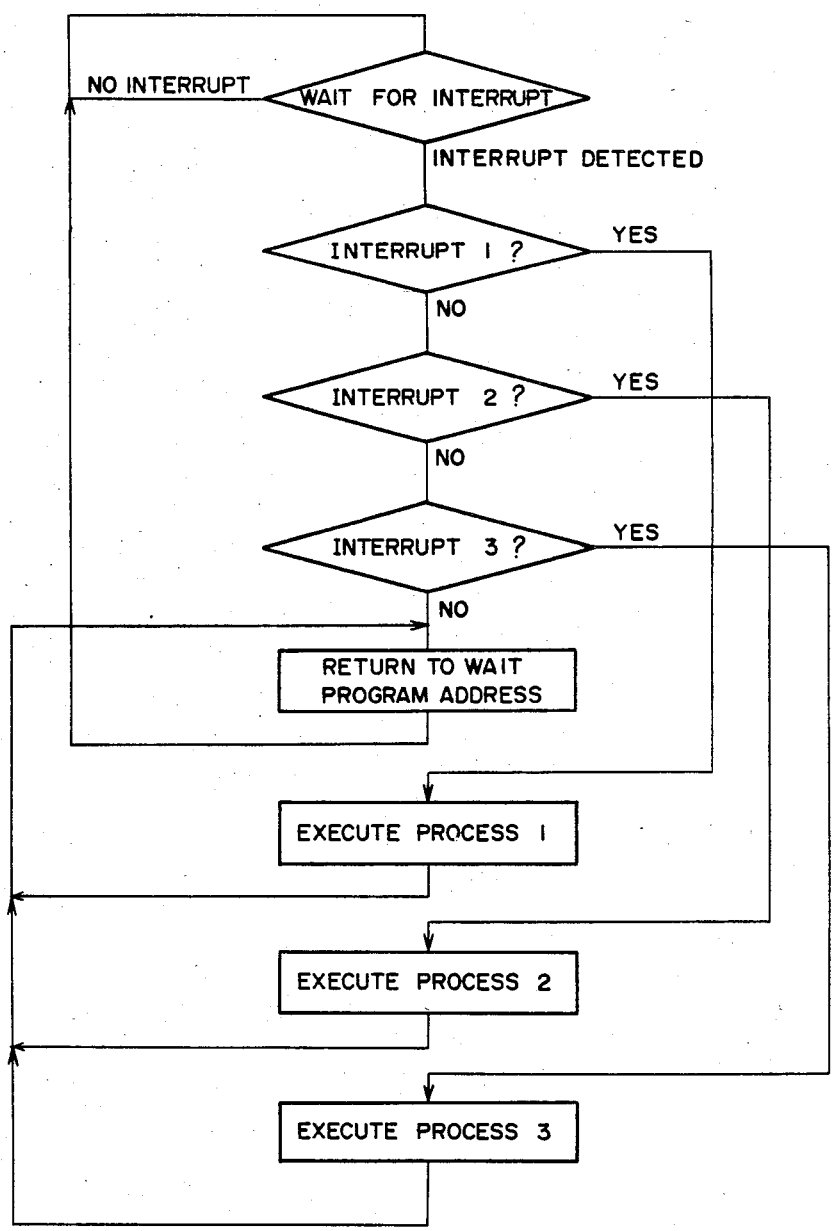
FIG. 4 is a flowchart for the procedure of interrupt processes according to the present invention.
Figure 5:
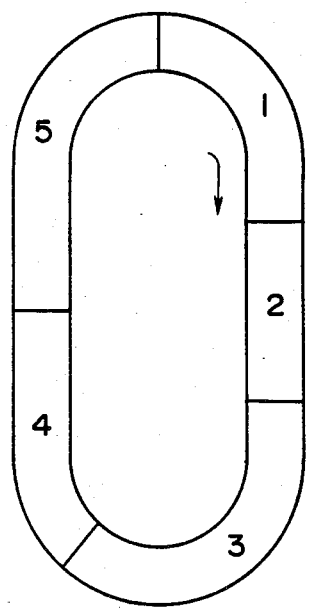
FIGS. 5 and 6 are diagrams for explaining the concepts of interrupt processes according to the prior art and the present invention.
Figure 6:
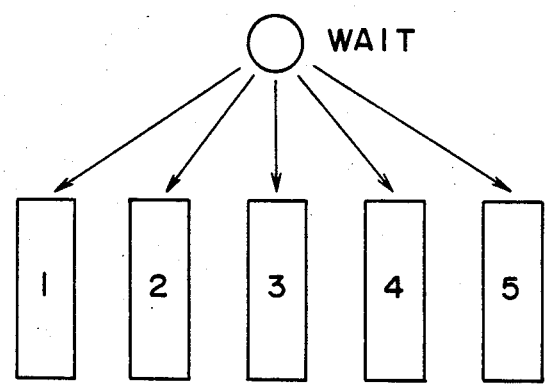
Figure 7:
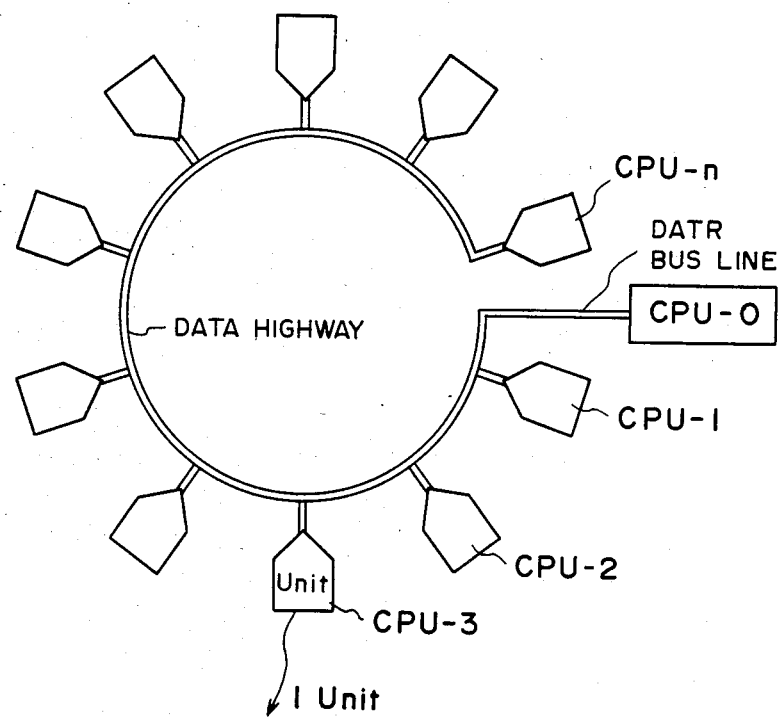
FIG. 7(A) is a schematic diagram of a control system for a combinatorial weighing apparatus to which the present invention is applied.
FIG. 7(B) is a diagram of one drive unit.
Figure 7:
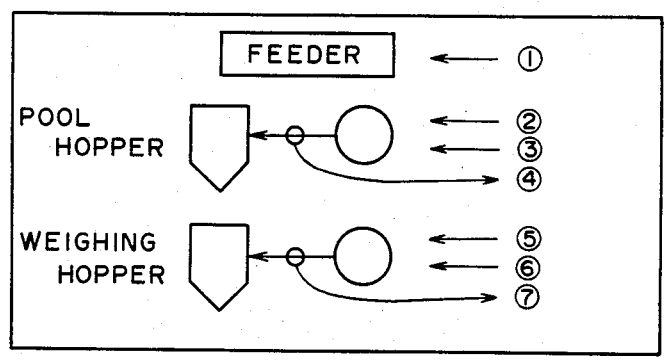

The present invention is based on such characteristics of an interrupt program. FIG. 4 is a flowchart for a control procedure in accordance with the present invention. When an interrupt request 1 is given while waiting for an interrupt command, a CPU accepts the request and executes a process 1 according to a prescribed program. When the process 1 is completed, the CPU returns to an address of an interrupt wait program for waiting for an interrupt command. Then, the CPU executes processes 2, 3 in response to interrupt requests 2, 3, respectively, and thereafter returns to the address of the interrupt wait program. Such an interrupt procedure will be compared with a conventional interrupt procedure shown in FIG. 5. As shown in FIG. 5, interrupt requests 1 through 5 are successively accepted by a CPU which jumps to a certain address to execute a program. According to the present invention, independent interrupt wait addresses are established respectively for interrupt requests 1 through 5 (see FIG. 6). More specifically, a processing program to be executed by a microcomputer is all composed of interrupt programs, and a necessary procedure is started in response to an electric signal applied to an interrupt input terminal at all times.

An embodiment of the present invention will be described in greater detail with reference to FIGS. 7 through 10.

A combinatorial weighing apparatus to which the present invention is applied, has a plurality of independent drive units, and central processing units CPU-1 through CPU-n are associated respectively with the drive units and connected to a main CPU-0 for high-level processing operations. FIG. 7(A) schematically shows such a computer control system in which the drive unit CPUs (CPU1 through CPU-n) are interconnected by a data highway coupled by a data bus line to the main CPU (CPU-0).

Each of the drive units is constructed as shown in FIG. 7(B). Each drive unit is composed of a feeder time/feeder strength control device ①, a pool hopper clutch ②, a pool hopper brake ③, a pool hopper operation sensor ④, a weighing hopper clutch ⑤, a weighing hopper brake ⑥, and a weighing hopper operation sensor ⑦. A feeder is controlled by the feeder time/feeder strength control device ①. A pool hopper is operated with the pool hopper clutch ② and the pool hopper brake ③. The pool hopper operation sensor ④ ascertains whether the pool hopper has operated properly or not. A weighing hopper is operated with the weighing hopper clutch ⑤ and the weighing hopper brake ⑥. The weighing hopper operation sensor ⑦ ascertains whether the weighing hopper has operated properly or not.

Figure 8:
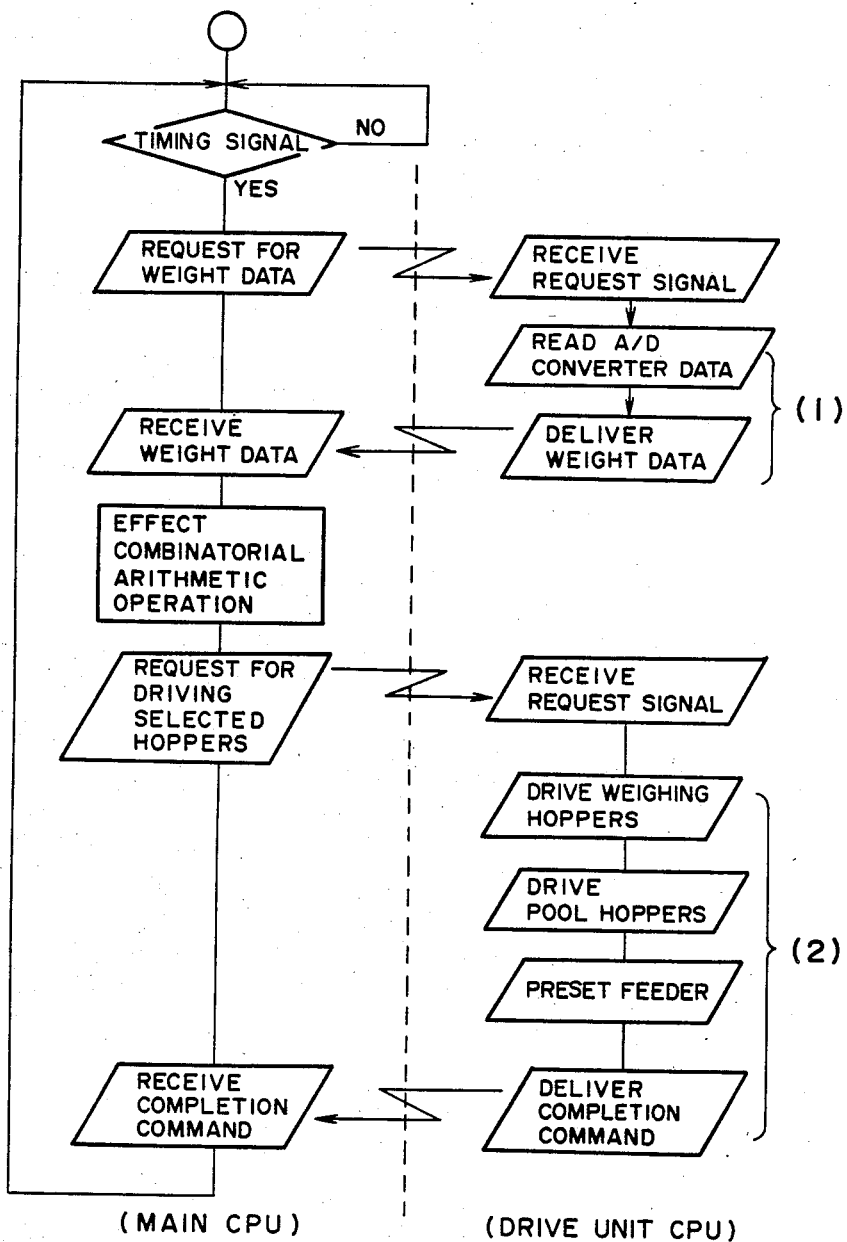
FIG. 8 is a flowchart for the processing operation of a main CPU and a drive unit CPU.

FIG. 8 is a flowchart of processes of operation of the main CPU (CPU-0) and the driver unit CPUs (CPU-1 through CPU-n) and their interrelationship. When a timing signal is given by the packaging machine to the main CPU, the main CPU delivers a weight data request signal to each of the driver unit CPUs. In response to such a weight data request signal from the main CPU, the driver unit CPUs read weight data from the respective weighing machines into the individual A/D converters and deliver each weight data to the main CPU {step (1)}. The main CPU stores the weight data, effects a combinatorial operation on the weight data, selects those weighing hoppers which give an optimum weight combination, and issues drive request signals to drive unit CPUs for driving the weighing machines. The drive unit CPUs, having received the request signals, drive the weighing hoppers, the pool hoppers, and preset the feeder, and, upon completion of such control, deliver a completion command to the main CPU {processing step (2)}.

Figure 9:
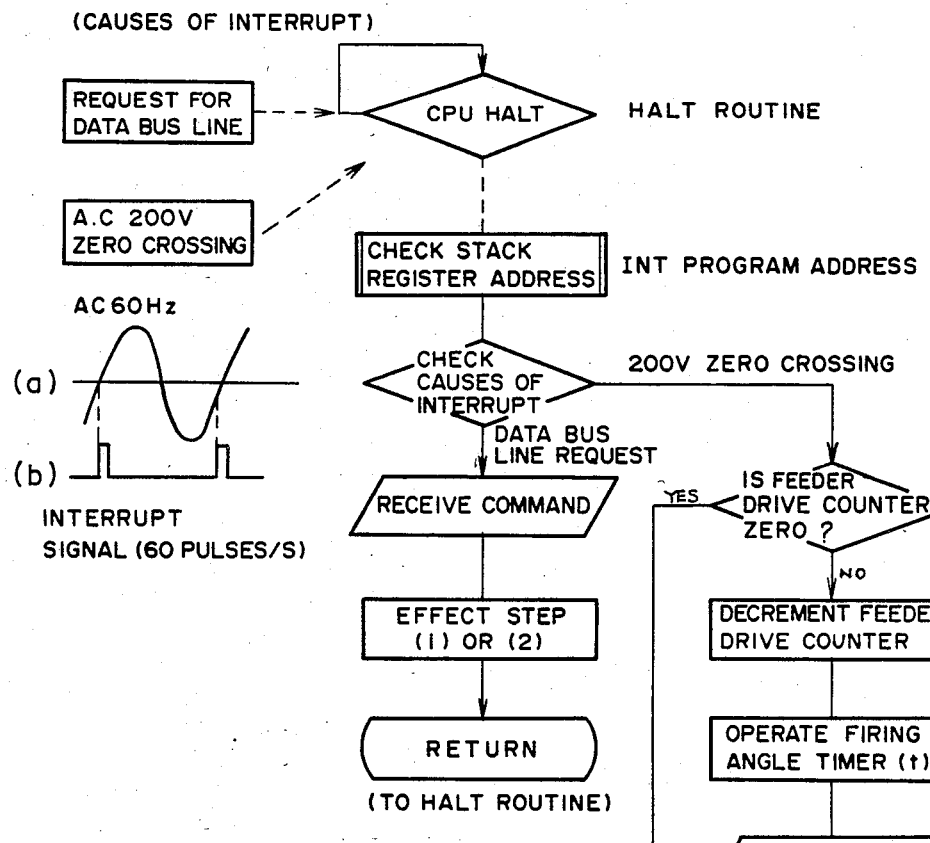
FIG. 9 is a flowchart for the interrupt procedure executed by the drive unit CPU.

FIG. 9 is a flowchart of specific details of the interrupt process of the drive unit CPU in each drive unit. The interrupt process is started by the request signal from the data bus line or a signal generated at a zero crossing point when an AC 200 V changes from a negative voltage to a positive voltage. The zero crossing point is detected from an AC power supply which drives the electromagnetic feeder. Therefore, where a power supply of 60 Hz is employed, 60 interrupt signals per second are generated. In normal operation, the interrupt signal is applied during a HALT routine of the CPU. Under abnormal conditions, however, the interrupt signal is applied while the CPU is running out of control. When the interrupt signal is applied, the drive unit CPU checks a stack register address to ascertain if the HALT condition of the CPU has been executed at normal addresses, thereby confirming if the CPU has run out of control or not. If the CPU has run out of control, then the address is rewritten as a proper address, i.e., an address in the HALT routine, and input-/output ports are initialized.

Figure 10:
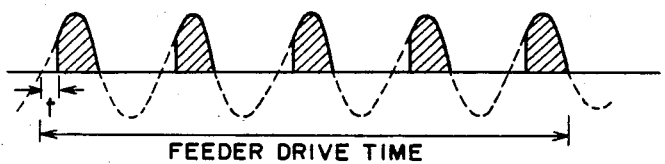
FIG. 10 is a diagram for illustrating phase control of an SCR for controlling an electromagnetic feeder.

Then, the drive unit CPU checks what has caused the interrupt process. If the interrupt process is started by a data bus line request from the main CPU, then step (1) or step (2) is executed. After step (1) or step (2) has been executed, the drive unit CPU returns to the HALT routine. If the interrupt process is started by a 200-V zero crossing, then the drive unit CPU first ascertains if the count of a feeder drive counter is zero or not. If zero, then the drive unit CPU returns to the HALT routine. The feeder drive counter is set to a preset value in a feeder presetting step in the step (2) in FIG. 8, after a hopper drive command has been received. When the feeder drive counter is set to a numerical value, a firing angle timer for the SCR for driving the electromagnetic feeder, is actuated to ignite the SCR at a phase angle t, as shown in FIG. 10, and then the drive unit CPU returns to the HALT routine. The feeder operates during a prescribed time, or periods set by the drive counter. If the operation time is 0.3 second, then the feeder is driven in 18 periods in the case of a 60 Hz power supply. The operation continues until the count of the drive counter falls to zero. When the count of the drive counter becomes zero, the SCR is extinguished and the drive unit CPU returns to the HALT routine, as illustrated in FIG. 9.

While the present invention has been described as being applied to a combinatorial weighing apparatus, the invention should not be interpreted as being limited to the combinatorial weighing apparatus. For example, the present invention may be applied to a combinatorial counting apparatus in which the weights of articles in the weight hoppers are converted into the numbers of articles, a combinatorial arithmetic operation is effected on the numbers of articles, and an optimum combination of added numbers is obtained which is equal or closest to a preset target number.

Although a certain preferred embodiment has been shown and described, it should be understood that many changes and modifications may be made therein without departing from the scope of the appended claims.

What I claim is:

1. A combinatorial weighing or counting apparatus for weighing articles charged in a plurality of weighing machines, for effecting a combinatorial arithmetic operation on obtained weights or numbers of the articles converted from the weights, for selecting an optimum combination of added weights or numbers which is closest to a target value within preset limits, and for discharging the articles from those weighing machines which form the selected optimum combination, said combinatorial weighing or counting apparatus comprising:
    a plurality of weighing machines each having a drive unit and an A/D converter for converting analog values of weights of articles into digital values;
    a main central processing unit, coupled to said weighing machines, for effecting the combinatorial arithmetic operation on the delivered weights, and for delivering operation commands including a command requesting said weighing machines to deliver the obtained weights and an article discharge command delivered to the weighing machines which have been selected as forming the optimum combination as a result of the combinatorial arithmetic operation;
    a plurality of individual drive unit central processing units, associated respectively with the drive units of said weighing machines and connected to said main central processing unit;
    means for delivering weight data, which are entered to said drive unit central processing units from the A/D converter of each of said weighing machines, to said main central processing unit; and
    means for controlling the drive units in response to the article discharge command which is delivered by the main central processing unit for discharging the weighed articles, the operation commands from said main central processing unit to said individual drive unit central processing units being generated in synchronism with zero crossing points of the AC power supply for each of the drive units by interrupt processes of said individual drive unit central processing units at all times.

2. A control method for a combinatorial measuring apparatus for measuring batches of articles stored in respective hoppers having associated drive units connected to an AC power supply and for providing measured batch values, the combinatorial measuring apparatus including a main central processing unit and a plurality of individual drive unit central processing units for controlling the drive units of the combinatorial measuring apparatus, said method comprising the steps of:
    (a) performing a combinatorial arithmetic operation on the measured batch values of the batches of articles stored in the hoppers using the main central processing unit, to select an optimum combination of the hoppers which combine to provide a total measured value which is equal to or closest to a target value within preset limits;
    (b) delivering operation commands from the main central processing unit to the individual drive unit central processing units in synchronism with zero crossing points of the AC power supply for each of the drive units, the operation commands being set by interrupt processes of the individual drive unit central processing units at all times; and
    (c) controlling the drive units in accordance with the operation commands using the plurality of individual drive unit central processing units.

3. A control system for a combinatorial measuring apparatus for measuring batches of articles charged in hoppers having associated drive units connected to an AC power supply, for providing measured batch values, and for discharging articles from the hoppers which combine to provide a total measured value which is equal to or closest to a target value within preset limits, said control system comprising:
    a main central processing unit for performing a combinatorial arithmetic operation on the measured batch values of the batches of articles stored in the hoppers to select the hoppers which provide the total measured value which is closest to the target value within preset limits, said main central processing unit including means for delivering operation commands in synchronism with zero crossing points of the AC power supply for each of the drive units;
    a plurality of individual drive unit central processing units, respectively connected to the drive units of the hoppers and connected to said main central processing unit, for controlling the drive units, said individual drive unit central processing units having interrupt processes, the operation commands delivered from said main central processing unit to said individual drive unit central processing units being set by said interrupt processes at all times.

4. A control system according to claim 3, further comprising a data bus line connected to said main central processing unit and said plurality of individual drive unit central processing units, for conducting the operation commands from said main central processing unit to said individual drive unit central processing units.

5. A control system according to claim 3, further comprising:
   a data bus line connected to said main central processing unit; and
   a data highway connected to said data bus line and said individual drive unit central processing units, wherein said individual drive unit central processing units are interconnected by said data highway.

* * * * *